Jan. 12, 1960 D. W. MINTON 2,920,804
GLASS HOLDING AND SERVING TRAY
Filed July 29, 1958

David W. Minton
INVENTOR.

United States Patent Office 2,920,804
Patented Jan. 12, 1960

2,920,804

GLASS HOLDING AND SERVING TRAY

David W. Minton, West Palm Beach, Fla.

Application July 29, 1958, Serial No. 751,773

3 Claims. (Cl. 229—1.5)

The present invention relates to certain new and useful improvements in food and drink holding and serving means, and has particular reference to a novel device for one-handed use.

There has long existed a recognized, but an apparently unfulfilled desire, to enable a person to hold a drink and food, canape wafers or the like, with one hand while, at the same time, having freedom of use of the other hand. It is an object in the instant endeavor to satisfactorily solve the problem and to do so through the medium of a simple, practical efficient and economical device. To this end and, in carrying out the principles of the instant invention, I have evolved and produced an acceptably practical and highly appreciated structural device which virtually assures accomplishment of the many aims which exist and some of which will now be touched upon.

Stated more explicitly, and after having familiarized himself with the disclosure of the invention, the reader will observe that it is such in construction that it aptly allows the user to meet and greet another with a familiar handshake with the right hand while holding the simple and efficient multipurpose device without any trouble whatsoever in the left hand. With this device in hand it is not necessary to locate a place to set the glass upon before one can satisfactorily partake of the food which is to be consumed.

With this invention it is unnecessary to hurriedly partake of the food when engaged in conversation at a gathering of people. Holding the device, the drink and food in one hand the user thereof has one hand free to assist in animated discussion which may, perhaps, require the use of at least one hand and which would not be practical with the drink held in one hand and the food in the other as is usually the case, for example, at a picnic, garden party or cook-out.

It is also to be noticed that the construction of the device is such that there is an elongated open-ended tapering receiver for telescopic reception and retention of the glass containing the drink or beverage. This part serves as a sheath or sleeve and, in effect, constitutes a jacket-like coaster for the glass.

In carrying out a preferred embodiment of the invention, two cooperating components are employed; namely, a sufficiently deep tray of requisite size and capacity and which also embodies means to satisfactorily hold a paper napkin or the like and which will accommodate small light sandwiches, crackers, canape wafers and so on. The bottom of the tray is centrally apertured to receive an insertable and removable open-ended tapering sleeve and the sleeve serves as the aforementioned receiver. That is to say, it is a jacket-like coaster or holder for a glass containing the beverage or whatever the liquid is to be served along with the food. Thus, with this construction, serving can be expedited due to the fact that sufficient food can be placed in the tray to practically eliminate the necessity of extra servings.

The invention may be made up of components which are constructed from suitable commercial plastics and the permanency of such products permits the components to be washed and used over again. Where cardboard or paper stock is employed, the components would be in the disposable or throw-away category. Regardless of whether paper or plastics are used, all sorts of decorations for festive occasions and colors for attraction may be utilized. One, too, can appreciate the elimination of wasted food and soiling of furnishings as often has to be contended with with present day methods of serving and entertaining guests at garden parties and the like. Then, too, economy of manufacture which will appeal to manufacturers and users with the added luxury of having these devices at hand for use will be appreciated by discreet people, by caterers and all persons involved.

Other objects, features and advantages will become more readily apparent from the following description and the accompanying drawing.

In the drawing wherein like numerals are employed to designate like parts throughout the same:

Figure 1:
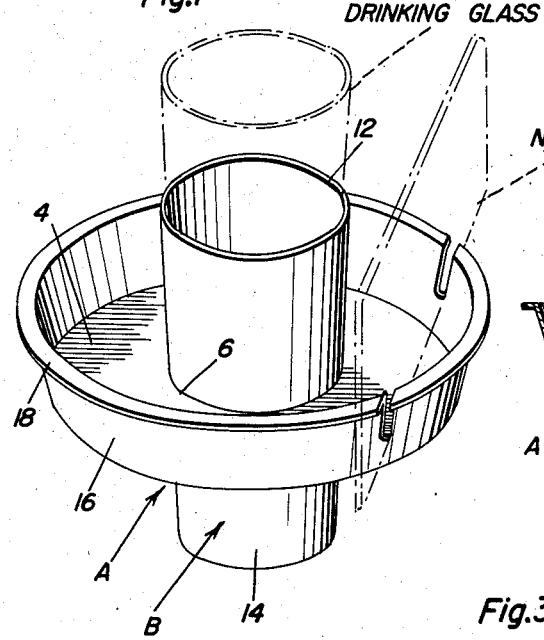
Fig. 1 is a perspective view of a holding and serving device for a drinking glass and miscellaneous small articles of food and showing how it is constructed and adapted to be used.
Figure 2:
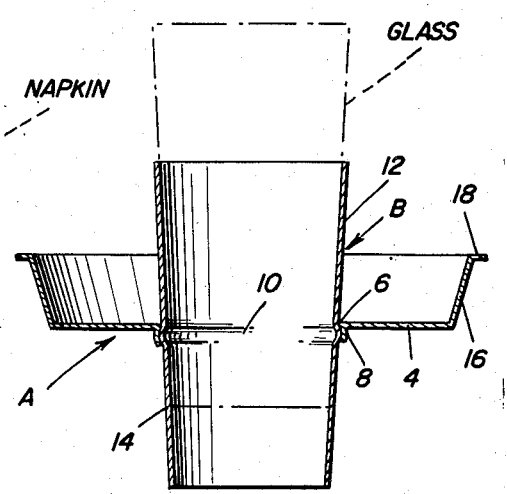
Fig. 2 is a sectional view of the same.
Figure 3:
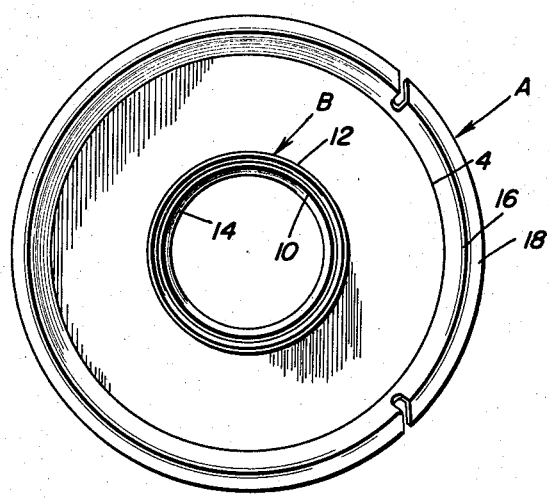
Fig. 3 is a top plan view thereof.

Referring now to the drawing, there are two components; namely, the holding and serving tray A and the coaster-type holder or receiver B. As already mentioned, the construction of these two components A and B can be heavy commercial plate cardboard pressed as a single unit or separately with the holder and tray in order to promote expeditious handling and packaging with all of the trays packaged together and all of the telescoping and nesting sleeves or receivers B to be packaged apart from the trays. The bottom 4 of the tray is provided centrally with an opening at 6 and a depending flange which is endless as at 8 and which is suitably shaped in cross-section to releasably engage a centrally disposed endless retaining bead 10 provided on the median or central portion of the open-ended receiver or sleeve B. With the bead thus arranged and with the same snapped releasably in place, as seen in Fig. 2, the upper half portion 12 projects above the bottom of the tray while the lower half portion 14 depends below the bottom where it serves with requisite nicety as a hand grip. The rim or wall of the tray is denoted at 16 and the upper reinforcing lip or flange at 18. With the components A and B together one is provided with a jacket for a drinking glass and a tray for various articles of food and also a holder for a napkin as shown in phantom lines in Fig. 1. The glass can be removed and replaced as desired without impairing the efficiency of the tray. Also, the napkin can be removed when desired and has no special effect on the practical utility of the glass holder or tray. By being in two parts, such as the preferred arrangement, provision is thus made for easy packaging and storage. When manufactured as one unit packaging and space required for shipping of course, increases considerably.

The invention is of such utmost simplicity in construction, purpose and accomplishment and its use so self-evident a more extensive description is apparently unnecessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A drinking glass holding and food serving device for use in the home, out-of-doors, at picnics, garden parties and so on, comprising a receiver for telescopic removable reception of a drinking glass, and a tray mounted on and carried by said receiver, said receiver comprising an open-ended sleeve for reception and friction retention of a drinking glass, said sleeve constituting, in effect, a pocket-type coaster, said tray being removably joined with a median portion of said receiver, said tray encircling the receiver and having a marginal retention rim.

2. A drinking glass holding and food serving device for use in the home, out-of-doors, at picnics, garden parties and so on, comprising a receiver for telescopic removable reception of a drinking glass, and a tray mounted on and carried by said receiver, said receiver comprising an open-ended sleeve for reception and friction retention of a drinking glass, said sleeve constituting, in effect, a coaster of the jacket type, said tray being removably joined with a median portion of said receiver, said tray encircling the receiver and having a marginal retention rim, said rim being provided with cooperating notches which together constitute means for holding a readily applicable and removable napkin.

3. For one-handed use at a garden party, picnic, cookout, or similar out-of-doors occasion, a portable serving device for use by an individual comprising a tray of prerequisite size, depth and capacity to accessibly contain articles of food ready for eating, said tray having a bottom provided with an upstanding marginal article confining rim, the central portion of said bottom having a sleeve accommodating opening therein and being provided with a depending flange aligned with and bordering said opening, and a sleeve providing a jacket-type coaster, said sleeve having a median portion passing through said opening, said median portion being provided with an endless outstanding retaining bead, said flange conforming in cross-section to the cross-section of the bead and firmly embracing the median portion and bead and providing a separable connection between the tray bottom and sleeve, a portion of said sleeve projecting to a position above the rim and a portion also depending below said bottom, said depending portion of the sleeve providing a hand-grip, said tray and sleeve being made of plastic material which adapts the over-all serving device for ready use, cleaning and washing and use over and over from time to time.

References Cited in the file of this patent

UNITED STATES PATENTS

| | | |
|---|---|---|
| 2,003,895 | Martin | June 4, 1935 |
| 2,321,519 | Rubinoff | June 8, 1943 |